United States Patent Office 2,736,751
Patented Feb. 28, 1956

2,736,751

PROCESS OF STABILIZING 2,2-BIS (PARA METHOXY PHENYL) 1,1,1 TRICHLOROETHANE

Edward Bernsohn, New Milford, and Harold Krichman, Bayonne, N. J., assignors to Ipa Chemical Company, a corporation of New Jersey No Drawing. Application October 1, 1952,
Serial No. 312,672

10 Claims. (Cl. 260—611.5)

This invention is a new and useful process of stabilizing 2,2-bis (para methoxy phenyl) 1,1,1 trichloroethane, and as a new composition of matter as 2,2-bis (para methoxy phenyl) 1,1,1 thichloroethane stabilized against thermal decomposition.

As is generally known, 2,2-bis (para methoxy phenyl) 1,1,1 trichloroethane is an insecticide and in use is held at a temperature which may range between 130 and 150° C., so that small amounts of the insecticidal composition will be vaporized and exert its insecticidal action. There are in addition other uses for the material in which it is also necessary or desirable to hold it at an elevated temperature for prolonged periods. Up till now the utility of the material has been restricted by the fact that at elevated temperatures it decomposes, so that only a minor part of the original material remains after a few weeks of exposure.

We have now found that this decomposition can be substantially arrested by incorporating with the material small amounts of a sodium salt of ethylenediaminetetraacetic acid together with small amounts of a compound of an alkali or alkaline earth metal combined with a weak acid to produce a compound which exhibits a mild alkaline reaction in aqueous solution. There are four possible sodium salts of ethylenediaminetetraacetic acid, namely the mono-, di-, tri-, and tetra-sodium salts. Our tests indicate that any of these will function satisfactorily although we prefer the di- or tri- sodium salts and have found that these are equally effective. As alkali and alkaline earth metals we prefer sodium, potassium and calcium. The following are examples of the weak acids referred to: carbonic, citric, tartaric and phosphoric. We prefer the alkali metal carbonates and phosphates.

In general we have found that good results are obtained by incorporating with the 2,2-bis (para methoxy phenyl) 1,1,1 trichloroethane 0.25% by weight of the sodium salt and 0.1% by weight of the said compound.

Following are examples of our invention. Each of these examples was run against control under identical conditions of time and temperature but without any stabilizing agent. At the expiration of five weeks only 33% of the control remained undecomposed.

*Example I*

0.5% by weight of the tri-sodium salt of ethylenediaminetetraacetic acid and 0.5% by weight of sodium carbonate were incorporated in a batch of 2,2-bis (para methoxy phenyl) 1,1,1 trichloroethane. This was held at a temperature of 145° C. for a period of five weeks and at the expiration of this time 93% of the original material was recovered in undecomposed condition.

*Example II*

0.3% by weight of the tri-sodium salt of ethylenediaminetetraacetic acid and 0.5% by weight of sodium carbonate were incorporated in a batch of 2,2-bis (para methoxy phenyl) 1,1,1 trichloroethane. This was held at a temperature of 145° C. for a period of five weeks and at the expiration of this time 68% of the original material was recovered in an undecomposed condition.

*Example III*

0.5% by weight of the tri-sodium salt of ethylenediaminetetraacetic acid and 0.5% by weight of potassium carbonate were incorporated in a batch of 2,2-bis (para methoxy phenyl) 1,1,1 trichloroethane. This was held at a temperature of 145° C. for a period of five weeks and at the expiration of this time 90% of the original material was recovered in undecomposed condition.

*Example IV*

0.5% by weight of the tri-sodium salt of ethylenediaminetetraacetic acid and 0.5% by weight of di-sodium hydrogen phosphate were incorporated in a batch of 2,2-bis (para methoxy phenyl) 1,1,1 trichloroethane. This was held at a temperature of 145° C. for a period of five weeks and at the expiration of this time 86% of the original material was recovered in undecomposed condition.

The foregoing specific description is for purposes of illustration and not of limitation and it is therefore our intention that the invention be limited only by the appended claims or their equivalents wherein we have endeavored to claim broadly all inherent novelty.

We claim:

1. Process of stabilizing 2,2-bis (para methoxy phenyl) 1,1,1 trichloroethane against decomposition resulting from elevated temperatures, which comprises incorporating therewith at least 0.25% by weight of a sodium salt of ethylenediaminetetraacetic acid and at least 0.1% by weight of a compound selected from the group consisting of alkali metal and alkaline earth metal salts which exhibit a basic reaction in aqueous solution.

2. Process according to claim 1 in which the sodium salt of ethylenediaminetetraacetic acid is the tri-sodium salt.

3. Process according to claim 1 in which the sodium salt of ethylenediaminetetraacetic acid is the tri-sodium salt and the said compound is an alkali metal carbonate.

4. Process of stabilizing 2,2-bis (para methoxy phenyl) 1,1,1 trichloroethane against decomposition resulting from elevated temperatures, which comprises incorporating therewith about 0.5% by weight of a sodium salt of ethylenediaminetetraacetic acid and about 0.5% by weight of a compound selected from the group consisting of alkali metal and alkaline earth metal salts which exhibit a basic reaction in aqueous solution.

5. Process according to claim 4 in which the sodium salt of ethylenediaminetetraacetic acid is the tri-sodium salt.

6. Process according to claim 4 in which the sodium salt of ethylenediaminetetraacetic acid is the tri-sodium salt and the said compound is an alkali metal carbonate.

7. As a new composition of matter a 2,2-bis (para methoxy phenyl) 1,1,1 trichloroethane stabilized against decomposition by heat, which comprises 2,2-bis (para methoxy phenyl) 1,1,1 trichloroethane containing at least 0.25% by weight of a sodium salt of ethylenediaminetetraacetic acid and at least 0.1% by weight of a compound selected from the group consisting of alkali metal and alkaline earth metal salts which exhibit a basic reaction in aqueous solution.

8. A composition according to claim 7 in which the sodium salt is the tri-sodium salt and in which the said compound is an alkali metal carbonate.

9. As a new composition of matter a 2,2-bis (para methoxy phenyl) 1,1,1 trichloroethane stabilized against decomposition by heat, which comprises 2,2-bis (para methoxy phenyl) 1,1,1 trichloroethane containing about 0.5% by weight of a sodium salt of ethylenediaminetetraacetic acid and about 0.5% by weight of a compound selected from the group consisting of alkali metal and alkaline earth metal salts which exhibit a basic reaction in aqueous solution.

10. A composition according to claim 9 in which the sodium salt is the tri-sodium salt and in which the said compound is an alkali metal carbonate.

References Cited in the file of this patent

UNITED STATES PATENTS 2,506,636    Flenner ---------------- May 9, 1950

OTHER REFERENCES

Martell et al.: The Properties and Uses of Ethylenediamine Tetra Acetic Acid and Its Salts, Jan. 20, 1910, pages 7 and 11.

Kendall: Smith's Inorganic Chemistry, New York Century Co. 1926 (page 364).

Hilfer: Drug & Cosmetic Industry, Jan. 1949, pages 40, 41 and 121.